United States Patent
Hamilton et al.

(10) Patent No.: US 8,223,715 B2
(45) Date of Patent: Jul. 17, 2012

(54) HANDOFF METHOD IN A WIRELESS LAN IN THE PRESENCE OF A RADAR SIGNAL

(75) Inventors: Mark A. Hamilton, Superior, CO (US); Keith R. Amann, Westminster, CO (US)

(73) Assignee: Polycom, Inc., Pleasanton, CA (US)

( * ) Notice: Subject to any disclaimer, the term of this patent is extended or adjusted under 35 U.S.C. 154(b) by 1037 days.

(21) Appl. No.: 11/503,002

(22) Filed: Aug. 11, 2006

(65) Prior Publication Data

US 2008/0037469 A1   Feb. 14, 2008

(51) Int. Cl.
*H04W 4/00* (2009.01)

(52) U.S. Cl. ......... 370/331; 370/329; 370/330; 370/332

(58) Field of Classification Search ........... 370/329–332
See application file for complete search history.

(56) References Cited

U.S. PATENT DOCUMENTS

| 6,697,013 B2 * | 2/2004 | McFarland et al. | 342/159 |
| 7,567,820 B2 * | 7/2009 | Bitran et al. | 455/552.1 |
| 2005/0245269 A1 * | 11/2005 | Demirhan et al. | 455/452.1 |

* cited by examiner

*Primary Examiner* — Dwayne Bost
*Assistant Examiner* — Yungsang Lau
(74) *Attorney, Agent, or Firm* — Wong, Cabello, Lutsch, Rutherford, Brucculeri LLP

(57) ABSTRACT

A wireless local area communications network that includes one or more access points each of which may have associated wireless communications devices in communication with it over a plurality of channels, some of which may be shared with a radar signal. The wireless communications devices are able to roam from one access point to another access point, in the presence of the channels shared with radar, in a seamless manner or in a manner in which the current communications session is not interrupted or delayed due to the requirement that any device in the network not transmit on those channels being shared with radar signals until the device can confirm that the channel is radar free. Furthermore, it is possible to guarantee that the communications session will not be disrupted during such roaming by configuring the wireless communications device to scan the wireless medium for only a minimum period of time necessary to detect a regularly occurring signal.

17 Claims, 6 Drawing Sheets

LAN (10)

HANDOFF METHOD IN A WIRELESS LAN IN THE PRESENCE OF A RADAR SIGNAL

FIELD OF THE INVENTION

This invention generally lies in the area of wireless communication technology for a local area network that shares the same frequency bands as a radar signal and specifically in the area of a wireless communications device roaming from one access point to another access point in the wireless network in the presence of DFS requirements.

BACKGROUND OF THE INVENTION

The IEEE standard 802.11a supplement to the IEEE standard 802.11 specification defines how to implement an orthogonal frequency division multiplexing (OFDM) system in the 5.15-5.25, 5.25-5.35, and 5.725-5.825 GHz unlicensed national information structure bands. As it happens, these frequency bands are shared by certain radar systems and so it is necessary, and required by the Federal Communications Commission, that all wireless communication devices utilizing these bands be able to sense the presence of a radar signal on a particular channel or channels and then quickly stop transmitting on the channel(s). Specifically, in a wireless LAN that includes a number of access points (APs) that transmit frames to and receive frames from wireless communications devices, it is required that master devices, which could be the APs for instance, are all capable of detecting the presence of radar signals in the 5 GHz frequency spectrum and notifying all of the slave devices, which in this case could be the wireless communications devices, that radar is present in one or more channels and that the slave devices should vacate those channels immediately. More specifically, prior to establishing a session with a slave wireless communications device, the master devices are required to sense the medium for some minimum, specified time period of time to determine whether radar signals are present in any particular channel(s). If no radar signal is detected in a particular channel, it is said that this channel is "available" to be utilized by the wireless communications device to establish a communications session. As mentioned above, if a master device detects a radar signal in any particular channel during the minimum, specified period of time, this channel is made "unavailable" and the master device is responsible for instructing all slave devices, associated with it, to immediately stop transmitting on this channel. Furthermore, a slave device is not permitted to transmit frames prior to receiving an enabling signal from a master device indicating that a channel is available for use. An enabling signal could be any frame of information transmitted by the master device such as a beacon or a probe response for instance.

The protocol described above is generally referred to as dynamic frequency selection (DFS) and it operates in the background of a wireless LAN so as to be largely transparent to the user of a wireless communications device as long as the device is stationary or only associated with one AP during an entire communications session. However, the continuity of a communications session between an AP and an associated wireless communications device can be interrupted in the event that the user of the wireless device moves around in space. Such movement is generally referred to as roaming and it results in the wireless communications devices having to disassociate with a current AP, whose transmission signal quality is deteriorating, and associate with another AP whose signal quality is better than that of the AP it is currently associated with.

The handoff process whereby a wireless communications device becomes disassociated from an AP it is currently communicating with and associates with another AP can be managed by either the AP or by the wireless communications device. Assuming that the process is managed by the wireless communications device, it monitors the signal quality of a communications link with the AP it is currently associated with and also monitors the signal quality of a signal or signals it receives on a different channel or channels from one or more other APs that are within transmission range and with which it is not currently associated. At the point in time that the signal strength of the current communications link falls below a threshold and the signal strength received from another AP with which it is not currently associated rises above a threshold, the handoff process can be initiated. In order for a wireless communications device to associate with a new AP, it is necessary to first conduct an authentication process and then an association process. At the point that the wireless communications device sends an association request to a new AP, the current AP with which the wireless device has a communications link is free to stop sending frames to the wireless device. At this point, it is essential that the new AP respond very quickly to the wireless communication device's request to associate and that the new communications link is established with a minimum of delay. In practice there are delays, but such delays are not typically noticeable or objectionable to the user.

Continuing to refer to the handoff process in more detail, a wireless communications device typically transmits probes on one or more channels other than the one it is currently transmitting on in order to receive probe responses from other APs with which it might associate that will permit a higher quality communications link. The operation of transmitting a probe and receiving a probe response for each channel typically occurs between periods of transmission and reception of voice or other packets to or from the AP with which the wireless device is currently associated. Unfortunately, sending such probes in an 802.11a environment is not allowed prior to the wireless device knowing that the channel on which it is sending the probe is available, or radar free. The FCC dictates that devices must sense the medium for available channels and this process takes time which the phone can't easily accommodate during a session. This means that either the wireless communications device is responsible to scan each channel before transmitting a probe for some minimum period of time before the handoff process can begin or that the AP is responsible for scanning the medium for available channels. Clearly, it is not practical for the wireless communications device to scan the medium, as this would cause an unacceptable delay in initiating a communications session.

Generally, an AP in a WLAN operating according to the standard 802.11 specification transmits two types of signals that contain all of the information that a wireless communications device needs in order to complete the hand off process. One is a management type frame called a beacon and the other is a control type frame called a probe response. As it is necessary for a wireless communications device to transmit a probe signal to an AP in order to receive a probe response from the AP, and as such activity is not permitted in channels shared with radar, it is necessary to implement some method whereby the wireless communications device can rely on a signal, such as a beacon, that can be received without having to actively request it. On the other hand, beacons are only transmitted by AP's infrequently, for instance every 102.4 msec, therefore, it is necessary for the wireless device to passively scan the medium, during periods not otherwise employed by the communications device to transmit or receive frames from the AP with which it is currently associated, for at least a period of time necessary to be certain that an entire beacon is received. In other words, the wireless communications device operates in a time-sliced manner to communicate with the AP with which it is currently associated and to scan all of the other channels, both those shared with radar and those not shared with radar, in order to receive a signal indicating that some other channels are available on which to communicate with another AP.

Furthermore, it is important from the perspective of the wireless communications device user that the communications session be of consistently high quality. That is, the audio quality is of high fidelity, that the transmitted or received frames of audio information are not clipped or dropped and that there is no noticeable or only minimal delay added as the result of the hand off process. In order to provide such a high quality communications session on a consistent basis, it is necessary to quantify the time it takes to scan other channels in order to determine which ones are available and of these which ones are of the highest quality.

In light of the above problems associated with the hand off procedure in a network that shares its frequency band with radar signals, it is desirable that the hand off of a wireless communications device from one AP to another will not result in any noticeable discontinuity in the communication session. Further, it is desirable that the amount of time it takes to complete the hand off of a wireless communications device session from one AP to another AP is predictably small and that the wireless communications device is able to utilize both regularly occurring and irregularly occurring AP signals in order to determine whether a channel is available.

SUMMARY OF THE INVENTION

In one embodiment of our invention, a wireless LAN including a number of access points each one able to maintain a communications session over one of a number of channels with at least one wireless communications device with at least one of the channels being shared with radar, we have invented a method for the wireless communications devices to roam from one access point to another without interrupting the continuity of the communication session the method comprising the steps of calculating a minimum time for the wireless device to scan all of the access point channels in order to receive at least one regularly occurring signal from another access point, configuring a wireless communications device with the minimum scan time, the wireless communications device starting a communications session with a first access point and measuring and storing a signal quality of a signal received from the access point, and the wireless communications device operates during the communications session to actively and passively scan all of the channels [other than the one it is currently communicating to the first access point over] to receive, measure and store the at least one regularly occurring signal from the second access point, the wireless communications device determining that the signal quality of the at least one regularly occurring signal received from the second access point is better than the signal quality of the last signal received from the first access point, and the wireless communications device disassociating with the first access point and associating with the second access point.

In one aspect of our invention, the wireless local area network includes means for managing the timing of the transmission of frames of information from at least one access point to a currently associated wireless communications device.

In an alternative embodiment of our invention, we do not configure the wireless phones with the calculated minimum scan time period but rather configure the phones to initiate the hand off process at the point that they receive any "valid" signal from another AP, be it a beacon, a probe response or some other signal.

BRIEF DESCRIPTION OF THE DRAWINGS

FIG. 5b is a continuation of FIG. 5a.

DETAILED DESCRIPTION OF THE INVENTION

Figure 1:
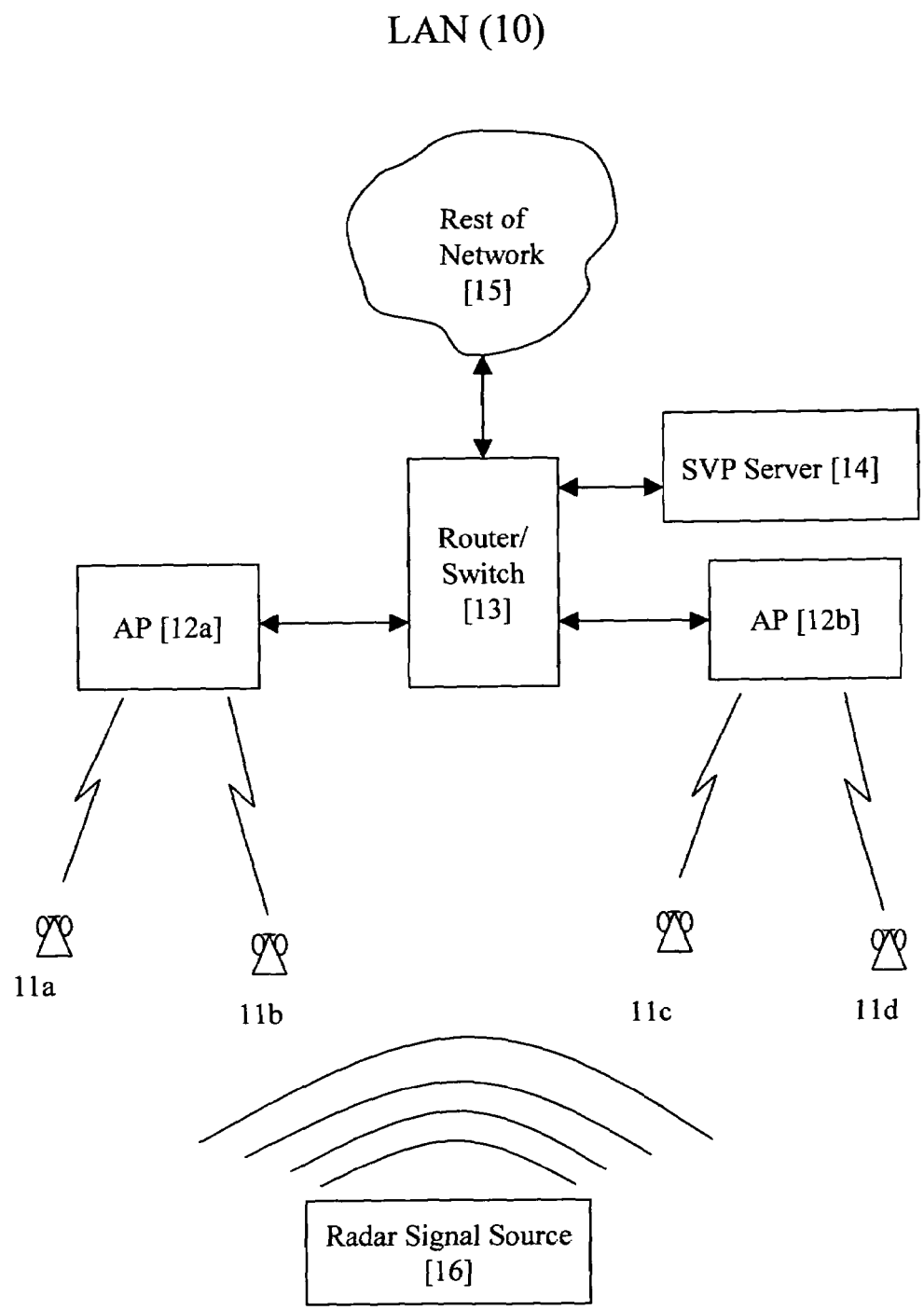
FIG. 1 is a high-level block diagram of a WLAN with multiple APs and associated wireless communications devices operating in the presence of a radar source.

We request that the entire contents of U.S. Pat. Nos. 5,673, 307 and 6,496,499, which are commonly assigned to the SpectraLink Corporation of Boulder, Colo., be incorporated in their entirety into this application by reference. FIG. 1 shows a local area network 10 (LAN) which is composed of a wireless portion and a wired portion and operates in the 5 GHz frequency spectrum. For the purposes of this description, we will refer to both the wireless and wired portions of the LAN collectively as the LAN or simple the LAN 10. The LAN includes a number of wireless communications devices, which in this case are wireless phones 11a, 11b, 11c, and 11d, which are used to transmit and receive frames of voice or data information over the wireless medium to and from access points (AP's) 12a and 12b with which they are associated. In this case, phones 11a and 11b are associated with AP 12a and phones 11c and 11d are associated with AP 12b. The access points generally serve as the wireless phones interface to the wired portion of the network which can operate according to the IEEE 802.3 standard, otherwise commonly known as Ethernet. Suitable APs are sold by many vendors including Cisco, Aruba, or Trapeze Networks. The network device 13, herein after referred to as the router, generally operates to receive frames of information from one AP, AP 12a for instance, and to transmit them to another AP, AP 12b for instance, according to the destination address information contained in the frame. In general, SVP (SpectraLink Voice Priority) Server 14 functions to regulate or manage the times at which the wireless phones can expect to receive frames of information and it also functions to group frames together in time. Both the timing and grouping functionality provided by the SVP server results in power savings for the wireless phone, which results in longer battery life, and seamless hand-off of a wireless phone from one AP to another when the wireless phone is roaming. The functionality of the SVP server will not be described in this application in detail as this technology is thoroughly described in the referenced U.S. Pat. No. 6,496,499. It should be understood, however, that the SVP functionality does not have to be provided in the LAN 10 as a separate SVP Server 14, but alternatively, it can be incorporated into an AP or the wireless phones as will be described latter in this application.

Continuing to refer to FIG. 1, the LAN 10 shares the 5 GHz frequency spectrum with radar signals which are represented here as a radar source 16. Radar source 16 may transmit radar signals periodically or continually on one or more channels that the wireless phones and AP's are transmitting or receiving on. Communications devices operating in the 802.11a frequency spectrum typically transmit and receive on twenty three channels, fifteen of which channels are shared with radar. For the purposes of this description, we assume that channels 1 to 8 are not shared with radar or are radar free and that channels 9 to 23 are shared with radar. In order for the AP's 12a and 12b and the wireless phones 11a, 11b, 11c and 11d to operate in this shared frequency spectrum, a spectrum sharing protocol has been adopted which is referred to as dynamic frequency selection or DFS. This protocol generally requires that a master device will employ a radar interference detection function to monitor the frequency spectrum for at least some specified minimum period of time for an available channel, or a channel that is radar-free, prior to transmitting information over the wireless medium. During normal operation, the master device will monitor the fifteen channels in the frequency spectrum shared with radar and if it detects a radar signal on one or more channels during this time will instruct all slave devices associate with it, and operating on that channel, to immediately discontinue transmitting on that channel. In practice, the slave device have some maximum period of time to associate with some other master device before discontinuing transmission on the channel. The slave devices should be configured such that they do not transmit a frame of information over the wireless medium on any channel before receiving a signal from the master device indicating which channels are available. The slave device will immediately discontinue all transmission when it is instructed to do so by the master device and will not resume transmitting until it receives the signal from the master device with an indication of which channels are available.

During normal, non-roaming operation, a slave device, wireless phone 11a of FIG. 1 for instance, might be instructed by a master device, AP 12a for instance, to discontinue transmitting on a particular channel. However, in the event that the wireless phone 11a is moving around in space, or roaming, it is likely that it will start moving out of range of AP 12a, and as the result of moving out of range the quality of the RF link between the phone and the AP will deteriorate. At the time this happens or prior to this happening, the phone will start looking for another AP with which to associate where the RF link is of higher, better or acceptable quality. One method by which a phone can determine which other AP's can provide a higher quality RF link and then quickly be handed off from one AP to another is the subject of U.S. Pat. No. 5,673,307 which is incorporated into this application by reference. Regardless, most methods for handing off a communications session from one AP to another are basically similar. Once the phone 11a determines that it is moving out of range of AP 12a, it starts transmitting probes, when it can, on channels other than the one it is currently transmitting and receiving frames from AP 12a. In the event that the probe is received by AP 12b, it will respond by transmitting a probe response which the phone can, among other things, use to calculate the signal quality and therefore the quality of a potential RF link with AP 12b. At the point in time that the quality of the RF link between the phone and AP 12a falls below a certain threshold level, the phone will initiate a new session with the best AP with which it can associate, or the AP with which it can establish the highest quality RF link, which in this case could be AP 12b.

The quality of an RF link or the signal quality can be measured in a number of different ways. For instance, the phone can measure the average signal strength in decibels over time or at a particular point in time and/or the phone can measure the bit error rate of a signal received from an AP. Regardless, at the point that the phone starts signaling AP 12b that it would like to associate with it, AP 12a is free to stop transmitting frames of information to the phone. In a LAN that is not sharing its frequency spectrum with radar, and so not required to conduct the DFS process mentioned earlier, roaming from one AP to another AP can be seamless from the perspective of the user. In other words, the user does not perceive a discontinuity or any degradation in the quality of their communications session. On the other hand, in a LAN that does share at least some portion of its spectrum with radar, the requirement to follow the DFS protocol can cause significant delays during the hand off process that can result in a discontinuity in a communications session which is noticeable to the user. Specifically, this discontinuity is the result of the DFS requirement that a wireless phone not transmit on any channel other than the one it is currently transmitting on until it receives an instruction from an AP that another channel is available. In other words, at the point that wireless phone 11a determines that the RF link with AP 12a is starting to or has fallen below a threshold level, instead of actively probing on all [other] channels to look for another AP with which to associate, it alternately passively senses all of the [other] channels that might be shared with radar and actively probes the channels that are not in a frequency band shared with radar with the hope of quickly receiving a signal of sufficient quality on an available channel from another AP, AP 12b for instance, with which it can associate. As mentioned previously, the wireless phone is alternately conducting this scanning operation and transmitting and receiving frames of voice or data information during a single service period, or the period of time from the beginning of one transmit/receive operation to the beginning of the next transmit/receive operation, in a time-sliced manner. The phone is able to support a communications session and scan the medium for available channels on alternative APs in a time-sliced manner without any noticeable session discontinuity because it "knows", due to the SVP functionality, when to expect voice frames from the AP with which it is associated. Provided the wireless phone can scan the entire set of all channels quickly enough, which in this case is less than approximately [more than] six seconds, it is possible that the wireless phone user will not notice any break in the communications session while roaming. However, depending upon the time that elapses from when the wireless phone commences looking for another AP with which to associate and when it receives a signal from another AP, the hand off process is likely not to be either regular or seamless in nature. We have solved this problem by calculating the minimum period of time that the wireless phone needs to sense the medium to be sure that it will receive a signal from another AP indicating the presence of an available channel and which signal may also include the information necessary to complete the hand off procedure. The phone is then configured to sense the medium for this calculated minimum period of time which ensures that the wireless phone will receive a beacon with the information necessary to determine which channels are "available" on which APs with which it can associated. We will describe how this calculation is made later with reference to FIG. 3.

The signal transmitted by an AP and received by the wireless phone can be a regularly occurring signal or a signal that is not transmitted by an AP on a regular basis, which we will refer to as a non-regularly occurring signal and we will refer to both the regularly and non-regularly occurring signals collectively as simply signals. A regularly occurring signal can be a management frame such as a beacon, for instance, and a non-regularly occurring signal can be a probe response for instance. Further, we use this calculated minimum time period to configuring the wireless phone's radio or network module to operate or passively sense the medium according to the DFS protocol. We will discuss how this time period is calculated in detail later with reference to FIG. 5. In an alternative embodiment, we do not configure the wireless phones with the calculated minimum time period but rather configure the phones to initiate the hand off process at the point that they receive any "valid" signal from another AP, be it a beacon, a probe response or some other signal. Regardless of the sensing technique utilized and of the type of signal the wireless phone receives, the functionality that the SVP server 14 of FIG. 1 provides is an important element to the overall method of our invention. Generally, as mentioned earlier, the SVP server functions to time and group the delivery of frames of voice information to the wireless phones. The effect of this predictable timing and grouping of the frame delivery to the wireless phone results in their having more time during a frame to do such things as passively sensing for alternative AP's to associate with.

Continuing to refer to FIG. 1, the radar source 16 is shown to be periodically or continually transmitting radar signals on one or more channels within range of both AP 12a and 12b and the wireless phones 11a, 11b, 11c and 11d. For the purposes of this description, we assume that the radar source is transmitting on channel 10.

Figure 2:
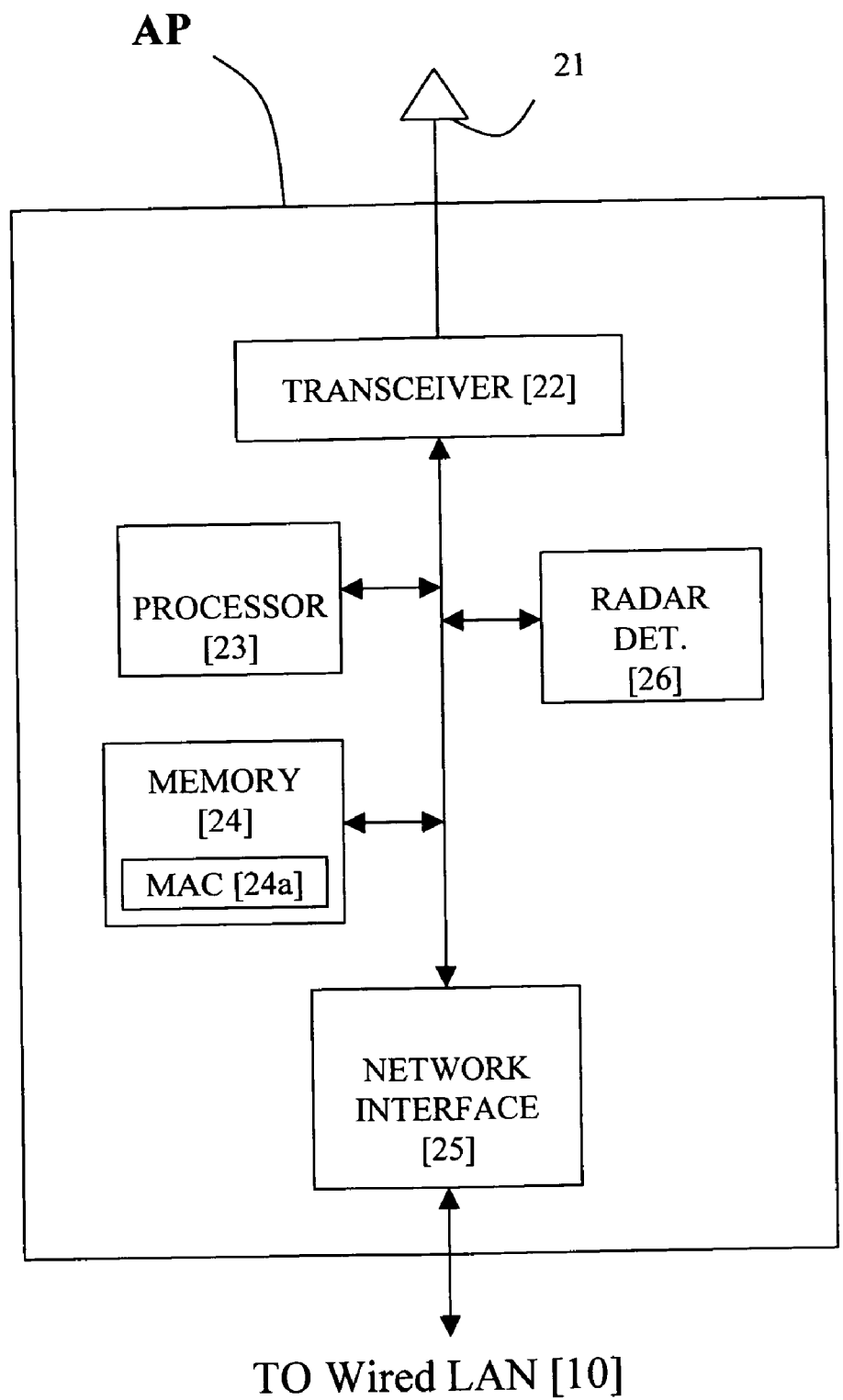
FIG. 2 is a high-level functional block diagram of an AP showing radar detection and notification capability.

Turning now to FIG. 2, which is a functional block diagram of one of the AP's 12a or 12b of the LAN 10 in FIG. 1. Any commercially available AP that operates in accordance with the IEEE 802.11a standard can be used in the LAN and are well known to those in the field of wireless communications. The AP generally operates to transmit or receive frames of voice information to or from a wireless phone. If receiving frame from a wireless phone, they are placed into a queue or queues where they are available to be transmitted to a destination wired device on the wired portion of the LAN. More specifically, the AP is designed to receive the frames in the 802.11 data frame format, for instance, and converts the frames of information into the well known 802.3 Ethernet format which can then be transmitted over the Ethernet to the wired devices on the wired portion of the LAN and vise-versa. The AP of FIG. 2 has an antenna 21, transceiver 22, processor 23, memory 24, Ethernet interface 25 and radar detector 36. The antenna 21 operates to propagate wireless voice signals and is the initial reception point for incoming wireless voice signals. The antenna is connected to a transceiver 22, which operates to demodulate the signals containing voice information received from the antenna or to modulate signals prior to their being sent to the antenna. The transceiver 22 is connected over parallel bus 27 to a processor 23 and memory 24. The processor generally functions, in conjunction with memory 26, to manage the operation of the AP. More specifically, memory 24 is used to store a software module that implements medium access control (MAC) functionality. The fundamental medium access protocol specified by 802.11 is a distributed coordination function (DCF), known as carrier sense multiple access with collision avoidance (CSMA/CA). In operation, the CSMA/CA protocol reduces the probability that collisions will occur between two or more wireless devices that have been waiting for the medium to become idle. A distributed carrier sense strategy is employed where each wireless device in the LAN monitors the state of the medium and at the point that the medium becomes idle, the device starts a random back off procedure which must be completed before it gains access to the medium. The use of this random back off procedure decreases the probability that collisions will occur.

As mentioned previously with respect to FIG. 1, network devices configured to be the master devices are AP 12a and 12b, and they are required to be able to detect the presence of radar signals in the 5 GHz frequency spectrum and to clear any channel on which a radar signal is present. This is referred to as DFS and both AP 12a and 12b include a radar detector 26 that operates to detect the presence of radar signals. There are a number of different techniques that can be used for detecting radar signals and several commercially available AP's incorporate this capability, so we will not discuss how radar signals are detected here, nor will we discuss how an AP generates a signal notifying other wireless devices in the LAN that a radar signal is present. All of this detection and notification functionality is provided by AP's and has no bearing on the specifics of the embodiment of our invention. Finally, with reference to FIG. 2, the 802.11 to 802.3 interface 25 generally operates to convert frames of information from the 802.11 format to the Ethernet format and transmit these frames to the wired portion of the LAN 10 and vise-versa.

Figure 3:
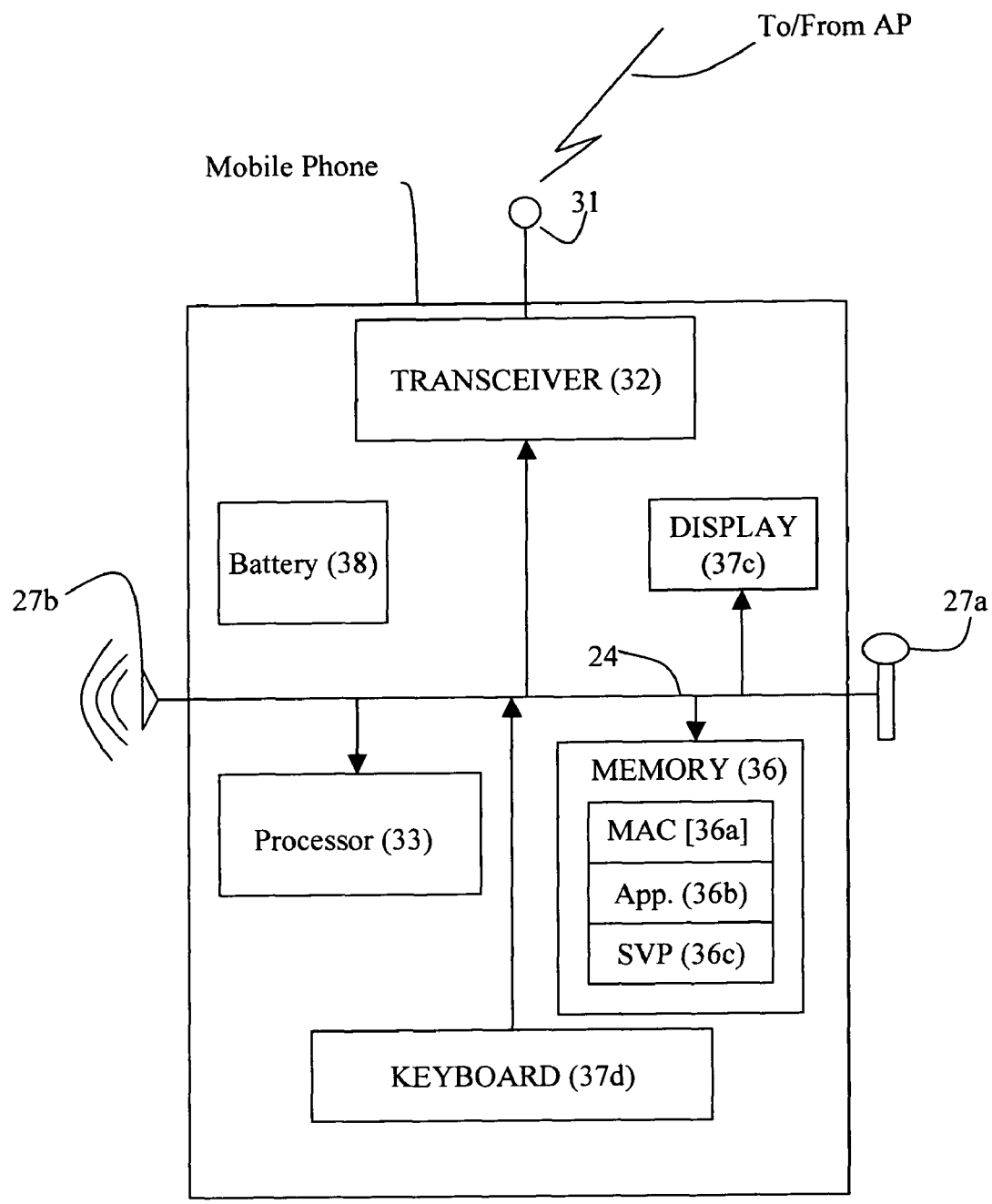
FIG. 3 is a high-level functional block diagram of a wireless communications device configured to operate according to the 802.11a standard.

FIG. 3 is a functional block diagram showing a wireless phone suitable for use with our invention and for the purposes of this description can represent any one of the wireless phones 11a, 11b, 11c and 11d shown in FIG. 1. The wireless phone includes an antenna 31, which operates to propagate wireless signals and is the initial reception point for incoming wireless signals. The antenna is connected to a transceiver 32, which operates to demodulate the signals containing voice information received from the antenna or to modulate signals prior to their being sent to the antenna. The transceiver is connected over a parallel bus 34 to, a processor 33, memory 36, microphone 37a, speaker 37b, display 37c and keyboard 37d. The processor 33 generally functions in conjunction with memory 36, and under the control of a telephony application 36b and which is stored in the memory, to perform certain functions necessary for the operation of the phone. The telephony application 36b generally controls such functionality as initiating, maintaining, and tearing down [communications] voice sessions. The hand off procedure and the routine/procedure employed to determine which channels have the highest quality signals as described above with reference to FIG. 1, are also implemented in a medium access control (MAC) module 36a. Specifically, the MAC controls the operation of the wireless phone such that it actively transmits probes on some channel, for instance on channels one to eight and passively senses the medium on other channels, for instance on channels nine to twenty three. Further, the MAC can be configured such that it causes the wireless phone to actively scan during one service period and passively scan for another service period. The MAC accesses a lookup table in memory that is populated with information about which channels are shared with radar and which channels are not shared with radar in order to conduct the active/passive scanning process. This service period will be described later with reference to equation 1.0 below.

Continuing to refer to FIG. 3, the memory 36 can be an EEPROM, RAM or flash memory and is generally employed to store the telephony application, as previously mentioned, and to store the software module that implements medium access control 36a (MAC) functionality which is the essentially the same as the MAC functionality described earlier with reference to FIG. 2 with the additional hand off procedure functionality described above. The SVP module 36c stored in the memory 36 provides the same SVP functionality as described earlier with reference to FIG. 1 and so we will not describe its operation again here.

As previously described with reference to FIG. 1, as a result of sharing the 5 GHz spectrum with radar and the requirement to implement the DFS protocol, the hand off process is not likely to be either regular or seamless in nature. Specifically, the requirement of the wireless phone to passively sense the medium on channels shared with radar introduces unacceptable delay to the hand off process as well as the process for initiating a communications session, which is perceived by the user as a discontinuity or delay in the communication session. We have solved this problem by calculating the minimum period of time that the wireless phone needs to sense the medium to be sure that it will receive a signal from another AP indicating the presence of an available channel and which signal may also include the information necessary to at least initiate the hand off procedure. We then configure the wireless phone telephony application to scan at least one channel shared with radar for this minimum time period looking for at least one available channel in preparation for either initiating a communications session or a subsequent hand off procedure. Assuming that a communications session is already established, our method for scanning the medium for available channels is performed without interrupting the flow of the communications session and the two processes, scanning and running the session, are performed in a time-sliced manner. In the preferred embodiment of our invention, we combine the SVP functionality described earlier with reference to FIG. 1 with the minimum time period configuration technique in order to minimize the total time it takes the wireless phone to detect an available channel and then conduct the hand off procedure.

We employ equation 1.0, below, in calculating the total minimum time period required to scan the channels shared with radar and to probe the non-radar channels, before proceeding with the hand off routine which, among other things, includes authentication and a request for association.

$$T\text{min} = (1\ FT \times 8) + (1\ ST\text{min} \times 15) \qquad \text{Eq. 1.0}$$

In equation 1.0 above, the term "Tmin" equates to the total minimum period of time it takes for a wireless phone to receive a signal from all AP's within transmission range, which in the preferred embodiment are beacons that it can use to both determine which channels are available and determine [which channel on] which AP provides the highest quality RF link. The variable term "FT" equates to the period of time from the start to the end of one wireless phone service period which is a regular interval of time between a transmit/receive operation. The service period in the preferred embodiment of our invention is 20 msec, which for the purposes of our calculation is equivalent to the time needed to broadcast a probe and receive a probe response. The variable term "STmin" equates to the minimum period of time the wireless phone needs to passively scan a single channel to be sure that it will receive a regularly occurring signal from any other AP.

Figure 4:
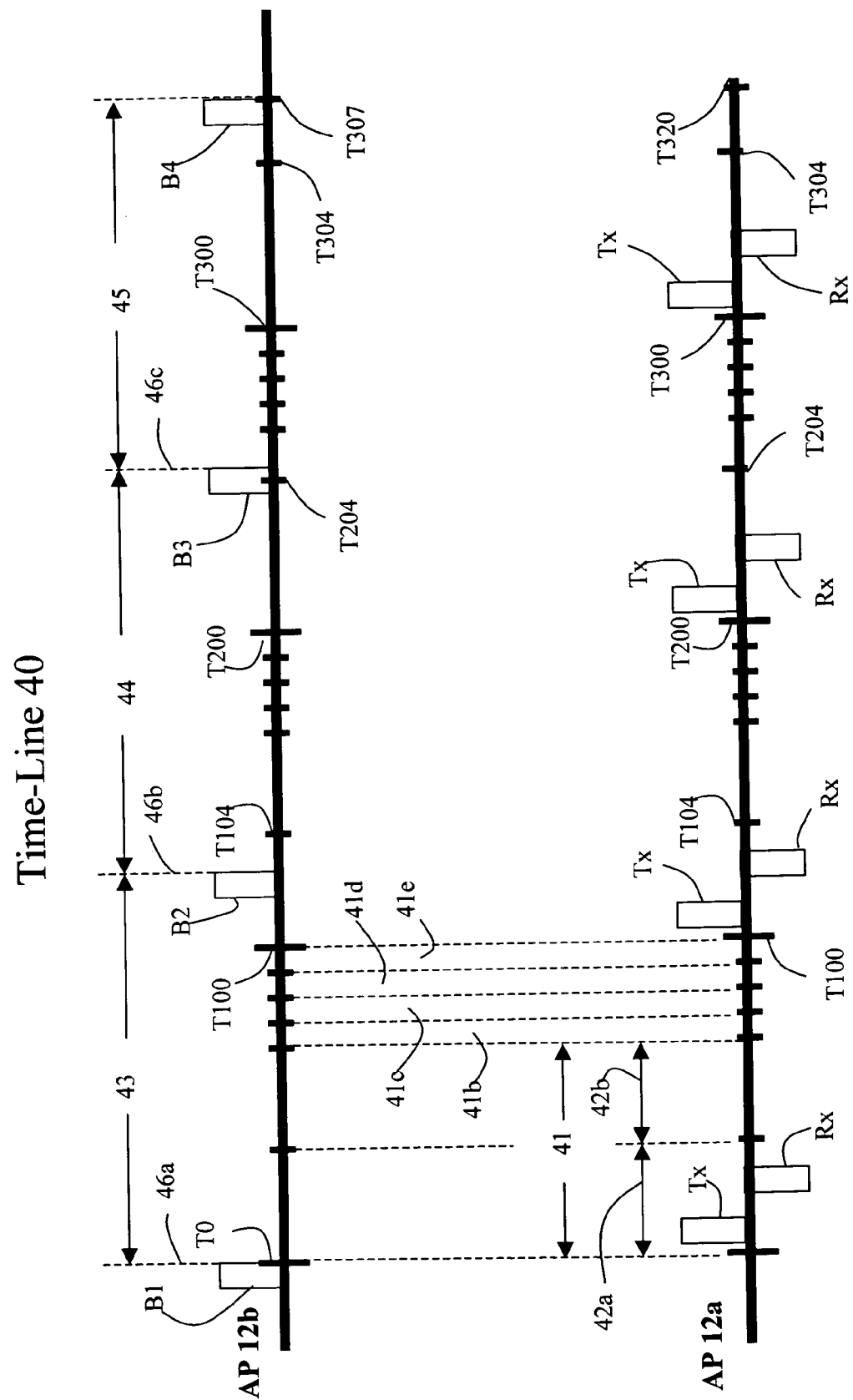
FIG. 4 is a time line showing the phone sensing the medium for a regularly occurring signal.

FIG. 4 is a time-line 40 that has been split to show the timing relationship between the beacons transmitted by AP 12b on the upper line and the wireless phone service periods supported by AP 12a on the lower line. We use this timing relationship to generate the logic we use to derive the Tmin term used in the previously described equation 1.0. Upper time-line labeled AP 12b shows three beacons, B1, B2 & B3 transmitted by AP 12b. These beacons are typically 750 usec in duration, are typically transmitted every 102.4 msec by the AP and can include information such as a timestamp, beacon interval, capability information, etc. that the wireless phone uses during the association process. Three beacon interval periods are shown in FIG. 4 as interval periods 43, 44 and 45. The first beacon interval period is defined as the time from the falling edge 46a of beacon B1 to the falling edge 46b of beacon B2. The beacon periods 44 and 45 are defined in a similar manner. The falling edge of B1 occurs at T0ms on the time-line, B2 occurs at T102.4ms on the time-line, B3 occurs at 204.8 ms on the time-line and b4 occurs at 307.2 ms on the timeline. The period during which the wireless phone is configured to both communicate with the AP with which it is associated and to actively probe or passively sense the medium for other available channels on which to perform the roaming process is referred to here as service period 41. The duration of the service period in the preferred embodiment of our invention is 20 ms, but this period could be either of longer or shorter duration and is not critical to the operation of our invention. Each service period is divided into two sub-periods, which for service period 41 are sub-period 42a and 42b. In this case, during sub-period 42a, the wireless phone communicates with the AP with which it is currently associated, AP12a for instance. This communication with AP12a can be such activity as transmitting and receiving frames of audio or control information. For the purposes of this description, we will assume that sub-period 42a is 4 ms in duration, but it can be of longer or shorter duration. As referred to previously, the SVP functionality residing either on SVP server 14 of FIG. 1 or SVP application 36c of FIG. 3 serves to group traffic from an AP, AP12a for instance, to a wireless phone, phone 11a for instance and send this traffic to the wireless phone at regularly scheduled times which could correspond to sub-period 42a, for instance. In this way, it is possible to minimize the duration of sub-period 42a and so maximize the time the wireless phone can spend on activity other than communicating with AP12a, such as in this case scanning for other available channels. For the purpose of this description, we assume that sub-period 42b is 16 ms in duration, but as with sub-period 42a can be of longer or shorter duration. The wireless phone is able to utilize this 16 ms time period to, among other things probe the medium for alternate AP's with which to associate or, in this case, passively sense the medium looking for other available channels. Although time-line 40 shows sub-periods 42a and 42b as appearing to being of approximately the same duration, as explained above this is not the case and we have distorted the scale in order to fit all of the information onto the time-line.

From the perspective of AP 12a of FIG. 4, the time-line labeled AP 12a shows five separate service periods, 41a, 41b, 41c, 41d and 41e between T0 and T100. The same number of service periods occur between T100 and T200 and T200 and T300. As this is the case, the duration from T0 to T100 is equivalent to 100 ms and T100 does in fact represent 100 ms on the time line as T200 represents 200 ms on the time line and so forth.

In order for the calculation using the previously mentioned equation 1.0 to be meaningful, it is necessary to first determine the time period associated with the term "STmin". We do this by making several assumptions. One assumption is that a beacon transmitted by an AP, AP 12b for instance, has an interval of 102.4 msec. as mentioned above. Referring to FIG. 4, this beacon interval is the interval of time on time-line 40 between the falling edges of B1 and B2. A second assumption is that the beacon duration is 750 usec and a third assumption has to do with how long a wireless phone can passively sense on another channel (other than the one it is currently associate with the AP) to receive a beacon. Such passive sensing typically takes place, as previously mentioned, during the second sub-period 42b and a reasonable assumption to make is that this sub-period is 16 msec in duration which leads us to conclude the wireless phone is able to passively sense/scan (call this passive scan time) on another channel 80% of the time. Using these assumptions about the beacon interval and passive scan time, if the wireless phone passively scans a channel shared with radar for the b sub-periods of at least 102.4 msec, it would be true that there is an 80% chance that an entire beacon would be received. However, since we need to hear the entire beacon, it is necessary for our calculation to subtract the beacon duration, or 750 usec, from the 16 msec during a frame that the wireless phone is able to passively scan. This results in a time period of 15.25 msec being available in a single service period during which a wireless phone can passively scan the medium. So by subtracting the beacon duration, there is now a 76% chance that an entire beacon would be received by a wireless phone. Now, if after scanning the medium for 102.4 msec, the wireless phone does not receive an entire beacon, this would have to be due to some portion of the beacon arriving at the wireless phone during the 4 msec period the phone is on its current channel. With the knowledge that the beacon duration is 750 usec, this leaves a window as large as 4.75 msec at the start of each frame during which the beacon would not be received.

Continuing with the above discussion, if we configure the wireless phone to scan the medium for another beacon interval, or another 102.4 msec, the window mentioned above shrinks to 2.35 msec. This it true because the start of the next beacon will have drifted 2.4 msec (difference between 100 ms duration for five service periods and one beacon interval of 102.4 ms) with respect to the beginning of a frame in the second scan period 44. As the window has now shrunk from 4.75 msec to 2.35 msec, the probability that the wireless phone will receive an entire beacon has increased to 88.25%. Extending the scan time to three scan periods shrinks the window to zero, and thus increases this probability to 100%. Pursuing the above logic to its conclusion, it becomes apparent that if a wireless phone scans the medium during the "b" sub-periods for at least 307.2 msec, that it should detect at least one complete beacon. Now, by substituting 320 msec, which is the 307.2 msec rounded up to an integral service period count, into the "STmin" term of equation 1.0 above, and by substituting 20 msec, which is one service period, into the "FT" term, we arrive at a minimum total time needed to scan all of the channels of the medium to be sure of detecting both an available channel and an AP that may provide the highest quality RF link. The result of this calculation is that the "Tmin" term equals approximately 4.9 seconds. The Tmin period can be shortened if the assumed beacon interval is 92.16 ms as opposed to 102.4 ms. Using the logic above, this means that there is a very good probability (approx. 100%) that the STmin term will be 200 ms. Using this in equation 1.0 we arrive at 3.16 seconds.

Figure 5A:
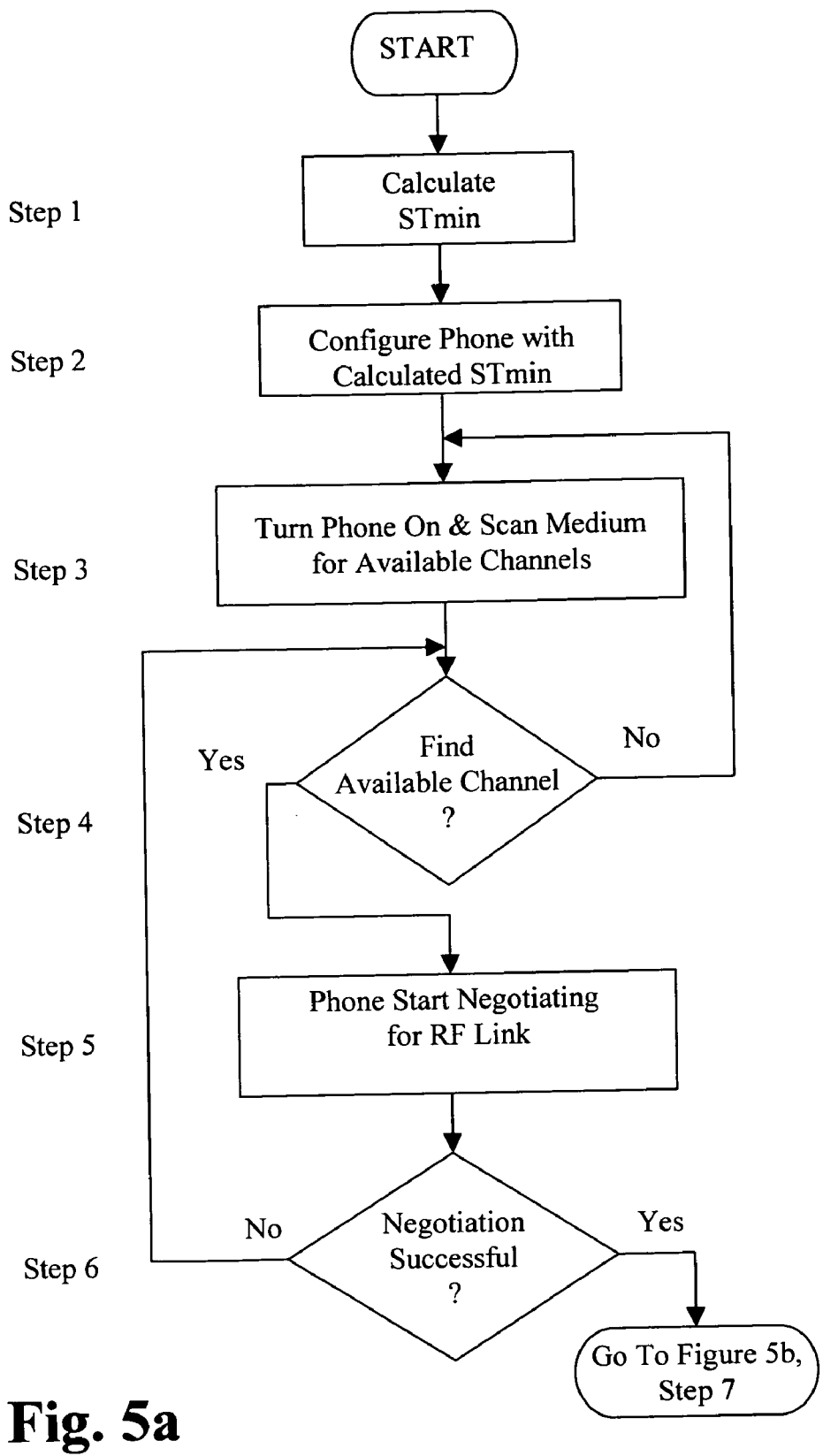
FIG. 5a is a logical flow diagram of the preferred embodiment of our invention.
Figure 5B:
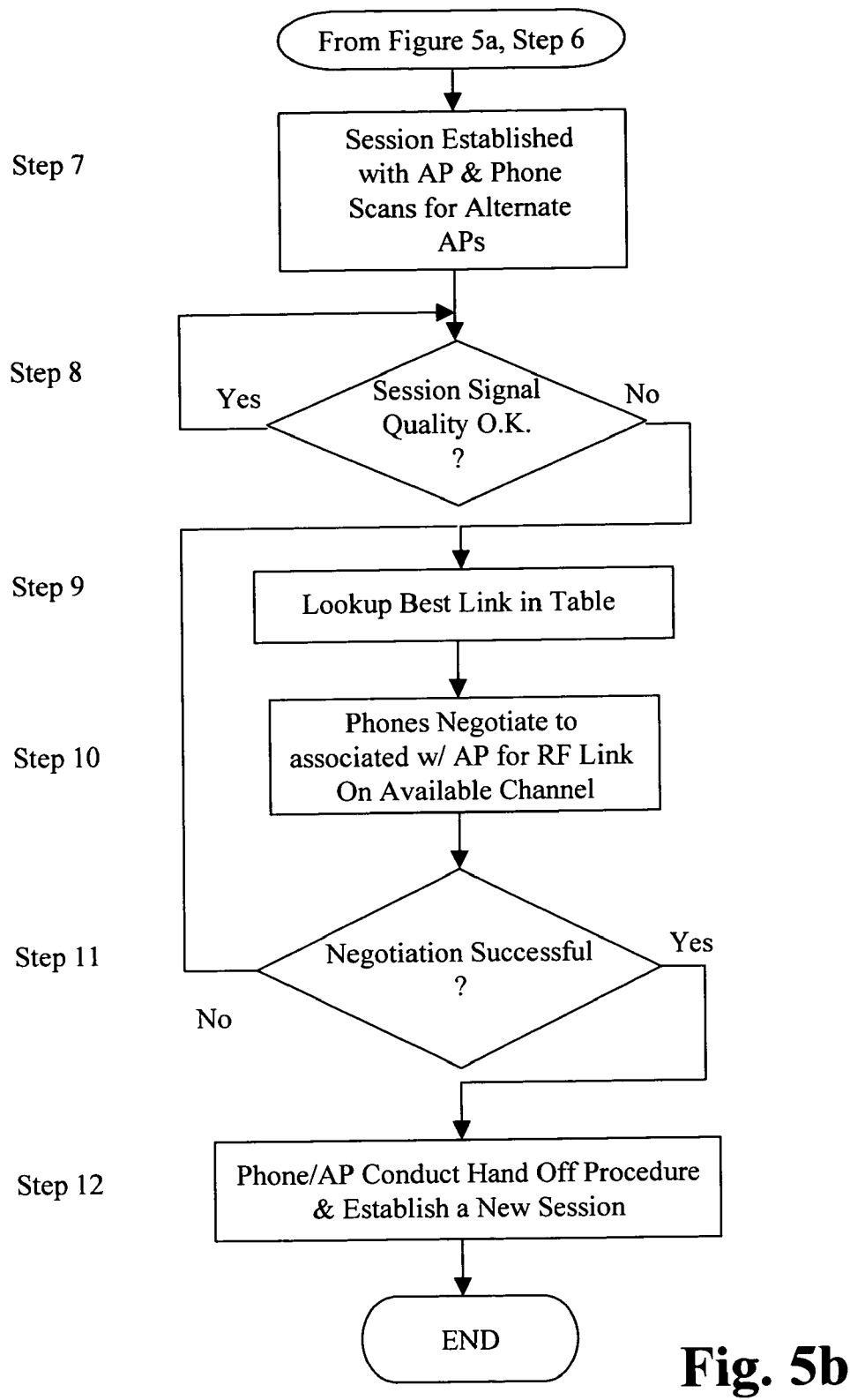

FIGS. 5a, 5b and 5c represent a high level logical flow diagram of the preferred embodiment of the method of our invention. Specifically, this flow diagram shows how the calculated "Tmin" is utilized by the wireless phone to ensure that an AP beacon, or some other regularly occurring AP signal, is received in a minimum period of time while a wireless phone is conducting a communications session. As was described above, a seamless hand off process can only be realized provided the wireless phone can scan for and detect a higher quality RF link with an AP with which to perform the handoff process within a reasonable period of time. This time is comparable to that required to travel between the transmission ranges of the APs. We have found that if this scanning process can be consistently maintained to be less than 5 seconds, the user will not experience any objectionable discontinuity in their communications session. We will now describe, with reference to FIG. 5a, how the wireless phone utilizes the Tmin value from the time it is turned on and initiates a communications session with an AP and to scan other channels that might provide the wireless phone with a higher quality RF link during roaming. In step 1 the WLAN administrator calculates the Tmin value using the previously described equation 1.0 and the assumptions also mentioned above. In step 2, the administrator configures the MAC 36a in FIG. 3 such that it scans the medium for the Tmin value looking for an available channel. In this case, assuming the wireless phone scans the medium for three full beacon intervals, rounded up to the next service period, the Tmin value is equal to approximately 4.9 seconds. In step 3, the wireless phone is activated and immediately starts scanning the medium looking for an AP, AP 12a for instance of FIG. 1, with an available channel on which to establish a communications session. The available channels can be any one or more of the twenty three channels specified by 802.11a. The wireless phone scans the medium in both an active and passive manner. Specifically, the wireless phone can actively probe the eight channels that are not shared with radar, in this case channels 1 to 8 and the wireless phone passively senses the fifteen channels that are shared with radar, which in this case are channels 9 to 23. The wireless phone will scan the medium on each channel for the STmin time during which it could receive a beacon from all APs within range which in this case could be either AP 12b or 12a for instance. Alternatively, in step 3 the wireless phone will only scan the medium on each channel for as long as it takes to receive any signal with a better signal quality than the signal quality of the RF link between the phone and the AP with which it is currently associated. This signal could be any type of management, data or control frame transmitted by an AP other than the one with which the wireless phone is currently associated. In step 4, when the wireless phone as the result of receiving the beacon determines that there is at least one available channel, it can start negotiating with the AP, AP12a for instance, that is transmitting on that channel to become associated with it. If, for some reason the wireless phone does not sense a beacon during the Tmin time period, then it would return to step 3 and starts the scan period over. In step 5, the wireless phone starts negotiating with AP 12a to establish an RF link as described earlier with reference to FIG. 1. If this negotiation with the new AP 12a is successful the process proceeds to step 7 in FIG. 5b, otherwise the process returns to step 4.

With reference to FIG. 5b, we will now describe the process the wireless phone follows during roaming to maintain the existing communications session while scanning for—available channels on alternative APs, AP 12b for instance, with which to establish a new RF link. In step 7, the communications session with AP 12a is established and the wireless phone 11a proceeds to receive frames from and transmit frames to the AP. During the time the wireless phone is in this communications session it also continually scans for, monitors and stores, in a table in memory 36 of FIG. 3, a measure of the quality of the RF link with AP 12a and with all other APs within range, such as AP 12b for instance. The wireless phone performs this RF link signal quality monitoring as described in step 3 of FIG. 5a. In step 8, if the RF link signal quality with AP 12a, as measure by signal strength, BER, or some other measure falls below the quality of the signal received from any other AP, AP 12b in this case, the process proceeds to step 9 where the phone selects an AP from the table in memory with which to associate that can provide the best quality RF link. On the other hand if, in step 8, the RF link is measured to be O.K., that is, the RF link with the current AP 12a is determined to be the best communication link available, the process loops on step 8. Alternatively, it may not be possible for the wireless phone to scan the medium for a period of time long enough to receive a beacon from another AP on all other channels. In this case the wireless phone can elect to associate with the first other AP with which it can establish a better quality RF link and the phone only scans the medium for as long as it takes to receive any signal with a better signal quality than the signal quality of the RF link between the phone and the AP with which it is currently associated. Continuing to step 10, the wireless phone starts negotiating to associate with AP 12b. We have generally described the association process earlier with reference to FIG. 1 and this process is well documented in the standard IEEE 802.11 specification and well known to those in the field of wireless, wireless communications.

The process described above with reference to steps 7, 8, 9 & 10 needs to be accomplished within a relatively short period of time when the wireless phone is roaming around in order for the communications session to continue uninterrupted. This period of time can vary depending upon the speed with which the phone is roaming, but under normal roaming conditions, with APs distributed in space according to manufacturers specifications, a communications session will not experience any discontinuity provided that it does not take longer than 5 seconds to scan the medium looking for available, alternative APs with which to associate. As previously mentioned, this timing is not an issue when operating in an environment in which the frequency band is not being shared with radar. However, in the presence of radar, as described previously with reference to FIG. 1, it does take longer for the phone to find alternative APs with which to associate. Continuing to refer to FIG. 5b, provided that the process of negotiating to associated with AP 12b is completed successfully, the process proceeds to step 12 where AP 12a discontinues sending frames to wireless phone 11 a and AP 12b starts sending frames to wireless phone 11a at which point the communications session continues and hand off process is complete.

We claim:

1. In a wireless local area communications network comprised of a plurality of access points for transmitting and receiving frames of information over a plurality of channels to and from at least one wireless communications device, at least one of the plural communications channels being shared with a radar signal, a method for the wireless communications device to roam from a first one of the plural access points with which it is currently associated to a second one of the plural access points without interrupting the continuity of the communication session comprising the steps of:

calculating a minimum period of time that is necessary for the at least one wireless communications device to scan all of the channels over which the plural access points can transmit and receive frames of information in order to receive at least one of a beacon or a probe response from any of the plurality of the access points;

configuring the at least one wireless communications device to scan all of the channels over which the plural access points can transmit and receive frames of information for no longer than the calculated minimum scan period;

the at least one wireless communications device establishing a communications session with a first one of the plural access points on one of the plural channels and measuring and storing a signal quality associated with signals received from the first one of the plural access points;

the at least one wireless communications device associated with the first one of the plural access points operates during the communication session to scan all of the plural channels over which the plural access points can transmit and receive frames of information for the calculated minimum period of time in order to receive the at least one of a beacon or a probe response from one of the other of the plurality of access points;

the at least one wireless communications device receiving the at least one of a beacon or probe response from a second one of the plural access points and measuring and storing a signal quality of the at least one regularly occurring signal;

the at least one wireless communications device determining that the signal quality of the at least one beacon or probe response received from the second one of the plural access points is better than the signal quality of the at least last signal the phone receives from the first one of the plural access points; and the at least one wireless communications device disassociating with the first one of the plural access points and associating with the second one of the plural access points.

2. The method of claim 1 further comprising means for managing the timing of the transmission of frames of information from the at least one wireless communications device and the first one of the plural access points that the wireless communications device is currently associated with.

3. The method of claim 1 wherein the step of calculating the minimum period of time necessary for the at least one wireless communications device to scan all of the channels over which the plural access points can transmit and receive frames of information in order to receive at least one beacon or probe response from an access point is comprised of the addition of a first quantity composed of one "FT" times the number of radar-free channels and a second quantity composed of "STmin" times the number of channels shared with radar.

4. The method of claim 1 wherein the step of configuring the at least one wireless communications device of claim one is comprised of programming a MAC module to scan all of the channels over which the plural access points can transmit and receive frames of information in order to receive at least one beacon or probe response from an access point.

5. The method of claim 1 wherein the signal quality is comprised of one of a signal strength or bit error rate.

6. The method of claim 1 wherein the wireless communications device is a mobile phone.

7. The method of claim 1 wherein the frames of information transmitted and received by the plural access points are at least one of a frame of voice information and a frame of data information.

8. The method of claim 1 in which the step of the at least one wireless communications device associated with the first one of the plural access points operates during the communication session to scan all of the plural channels over which the plural access points can transmit and receive frames of information for the calculated minimum period of time in order to receive the at least one beacon or probe response from one of the other of the plurality of access points is further comprised of both actively scanning those channels of the plurality of channels not shared with radar and passively scanning those channels of the plurality of channels shared with radar.

9. The method of claim 8 wherein the active scanning of those channels of the plurality of channels not shared with radar includes the at least one wireless communications device transmitting a probe signal to an access point other than the one the wireless communications device is currently associated.

10. In a wireless local area communications network comprised of a plurality of access points for transmitting and receiving frames of information over a plurality of channels to and from at least one wireless communications device and means for managing the timing of the transmission of frames of information from the at least one wireless communications device and an access point with which the wireless communications device is currently associated, at least one of the plural communications channels being shared with a radar signal, a method for the wireless communications device to roam from a first one of the plural access points with which it is currently associated to a second one of the plural access points without interrupting the continuity of the communication session comprising the steps of:

calculating a minimum period of time that is necessary for the at least one wireless communications device to scan all of the channels over which the plural access points can transmit and receive frames of information in order to receive at least one of a beacon or a probe response from any of the access points;

configuring the at least one wireless communications device to scan all of the channels over which the plural access points can transmit and receive frames of information for no longer than the calculated minimum scan period;

the at least one wireless communications device establishing a communications session with a first one of the plural access points on one of the plural channels and to measure and store a signal quality associated with signals received from the first one of the plural access points;

the at least one wireless communications device associated with the first one of the plural access points operates during the communication session to scan all of the plural channels over which the plural access points can transmit and receive frames of information for the calculated minimum period of time in order to receive the at least one beacon or probe response from one of the other of the plurality of access points;

the at least one wireless communications device receiving the at least one beacon or probe response from a second one of the plural access points and measuring and storing a signal quality of the at least one regularly occurring signal;

the at least one wireless communications device determining that the signal quality of the at least one beacon or probe response received from the second one of the plural access points is better than the signal quality of the at least last signal the phone receives from the first one of the plural access points; and the at least one wireless communications device disassociating with the first one of the plural access points and associating with the second one of the plural access points.

11. The method of claim 10 wherein the step of calculating the minimum period of time necessary for the at least one wireless communications device to scan all of the channels over which the plural access points can transmit and receive frames of information in order to receive at least one beacon or probe response from an access point is comprised of the addition of a first quantity composed of one "FT" times the number of radar-free channels and a second quantity composed of "STmin" times the number of channels shared with radar.

12. The method of claim 10 wherein the step of configuring the at least one wireless communications device is comprised of programming a MAC module to scan all of the channels over which the plural access points can transmit and receive frames of information in order to receive at least one beacon or probe response from an access point.

13. The method of claim 10 wherein the signal quality is comprised of one of a signal strength or bit error rate.

14. The method of claim 10 wherein the at least one beacon or probe response from the access point is one of a beacon frame and probe response.

15. The method of claim 10 wherein the wireless communications device is a mobile phone.

16. The method of claim 10 wherein the step in which the at least one wireless communications device associated with the first one of the plural access points operates during the communication session to scan all of the plural channels over which the plural access points can transmit and receive frames of information for the calculated minimum period of time in order to receive the at least one beacon or probe response from one of the other of the plurality of access points is further comprised of both actively scanning those channels of the plurality of channels not shared with radar and passively scanning those channels of the plurality of channels shared with radar.

17. The method of claim 16 wherein the active scanning of those channels of the plurality of channels not shared with radar in includes the at least one wireless communications device transmitting a probe signal to an access point other than the one the wireless communications device is currently associated.

* * * * *